United States Patent
Wu et al.

(10) Patent No.: US 6,826,768 B2
(45) Date of Patent: Nov. 30, 2004

(54) OPTICAL COMPACT DISK DRIVE WITH A VIBRATION-AND-NOISE ATTENUATING MECHANISM

(75) Inventors: Jen-Chen Wu, Chung-Ho (TW); Yi-Wei Lu, Chung-Ho (TW); Rong-Gui Lin, Chung-Ho (TW)

(73) Assignee: Micro-Star Int'l Co., Ltd., Chung-Ho (TW)

( * ) Notice: Subject to any disclaimer, the term of this patent is extended or adjusted under 35 U.S.C. 154(b) by 122 days.

(21) Appl. No.: 10/267,431

(22) Filed: Oct. 8, 2002

(65) Prior Publication Data

US 2004/0066727 A1 Apr. 8, 2004

(51) Int. Cl.⁷ .......................... G11B 17/03; G11B 33/14
(52) U.S. Cl. ........................... 720/651; 720/611
(58) Field of Search ................ 720/648, 649, 720/651, 601, 603, 611; 360/97.02, 97.03, 97.04; 361/690, 691, 692, 693

(56) References Cited

U.S. PATENT DOCUMENTS

| | | | |
|---|---|---|---|
| 6,212,147 B1 * | 4/2001 | Ishihara | 369/77.1 |
| 6,317,402 B1 * | 11/2001 | Huang et al. | 369/77.1 |
| 6,392,976 B1 * | 5/2002 | Lin | 369/77.1 |
| 6,493,310 B1 | 12/2002 | Kim et al. | 369/263 |
| 2002/0039340 A1 | 4/2002 | Minase | 369/75.1 |
| 2003/0218956 A1 | 11/2003 | Wu et al. | 369/75.1 |

FOREIGN PATENT DOCUMENTS

| | | |
|---|---|---|
| JP | 10-177755 | 6/1998 |
| JP | 2000-357385 | 12/2000 |
| JP | 2001-52405 | 2/2001 |

* cited by examiner

*Primary Examiner*—David L. Ometz
(74) *Attorney, Agent, or Firm*—Winston Hsu

(57) ABSTRACT

An optical compact disk drive includes a housing and a mounting seat with a disk-supporting tray that has opposite front and rear peripheral portions and that is formed with a recess between the front and rear peripheral portions and an elongated opening extending from a center of the recess to the rear peripheral portion. A pair of front air-communicating openings are formed in the front peripheral portion, and at least a rear air-communicating opening is formed in the rear peripheral portion. Air is permitted to flow from a bottom side to a top side of the disk-supporting tray through the front and rear air-communicating openings.

4 Claims, 6 Drawing Sheets

OPTICAL COMPACT DISK DRIVE WITH A VIBRATION-AND-NOISE ATTENUATING MECHANISM

BACKGROUND OF THE INVENTION

1. Field of the Invention

This invention relates to an optical compact disk drive, more particularly to an optical compact disk drive with a vibration-and-noise attenuating mechanism.

2. Description of the Related Art

The data reading speed for optical compact disk drives has been considerably increased in recent years. However, noise and vibration arising from rotations of a compact disk and a motor of the optical compact disk drive are also significantly increased due to the increase in the aforesaid reading speed.

FIGS. 1 and 2 illustrate a conventional optical compact disk drive that includes a housing 91 and a mounting seat 92 mounted in the housing 91. The mounting seat 92 includes a disk-supporting tray 95 formed with a disk-receiving recess 951 for receiving a compact disk 96 therein. The disk-supporting tray 95 is further formed with an elongated opening 955 that extends from a center of the disk-receiving recess 951 to a rear peripheral portion 94 of the disk-supporting tray 95 for exposing a rotary shaft 93 and a data reading head 97 to the compact disk 96. A pair of air-communicating openings 98 are formed in a front peripheral portion 99 of the disk-supporting tray 95 for permitting a vertical air flow from a bottom side of the disk-supporting tray 95 to a top side of the disk-supporting tray 95 due to pressure difference between the top and bottom sides upon rotation of the compact disk 96. Since there are more components (not shown) mounted on the mounting seat 92 below the disk-supporting tray 95 than above the disk-supporting tray 95, a tangential air flow (indicated as arrow (A) in FIG. 2) arising from the rotation of the compact disk 96 at the space below the disk-supporting tray 95 will have a lower speed than that at the space above the disk-supporting tray 95, which, in turn, results in the aforesaid pressure difference and the vertical air flow. However, due to the presence of the elongated opening 955 (which extends in an asymmetric manner relative to the disk-receiving recess 951), the data reading head 97 and peripheral components (not shown) for the data reading head 97, highly turbulent air flow tends to occur at a position adjacent to the elongated opening 955. As a result, undesired vibration of the compact disk 96 and loud noise can occur when the compact disk 96 rotates at a relatively high speed.

SUMMARY OF THE INVENTION

Therefore, it is an object of the present invention to provide an optical compact disk drive with a vibration-and-noise attenuating mechanism that is capable of overcoming the aforesaid drawbacks of the prior art.

According to the present invention, there is provided an optical compact disk drive that comprises: a housing confining a chamber therein and having a front opening; a mounting seat with a disk-supporting tray that is mounted movably in the chamber, that is movable inwardly and outwardly of the housing through the front opening in a horizontal direction, and that is recessed to form a disk-receiving recess which is adapted to receive a compact disk therein, the disk-receiving recess being confined by a recess-confining wall that has a circular base portion extending in the horizontal direction, a front riser portion which is circumferentially disposed around the base portion adjacent to the front opening and which extends from the base portion in a transverse direction relative to the base portion so as to confine a front side of the disk-receiving recess, and a rear riser portion which is circumferentially disposed around the base portion at a position opposite to the front riser portion and which extends from the base portion in the transverse direction so as to confine a rear side of the disk-receiving recess, the disk-supporting tray having a front peripheral portion that extends frontwardly from the front riser portion in the horizontal direction, and a rear peripheral portion that is opposite to the front peripheral portion and that extends rearwardly from the rear riser portion in the horizontal direction, the disk-supporting tray further having opposite top and bottom sides and being formed with an elongated opening that extends rearwardly from a center of the base portion to the rear peripheral portion; and a vibration-and-noise attenuating mechanism having a pair of front air-communicating openings formed in the front peripheral portion, and at least a rear air-communicating opening that is formed in the rear peripheral portion and that is disposed adjacent to the elongated opening, thereby permitting formation of a vertical air flow from the bottom side of the disk-supporting tray to the top side of the disk-supporting tray through the front and rear air-communicating openings due to pressure difference between the top and bottom sides upon rotation of the compact disk.

BRIEF DESCRIPTION OF THE DRAWINGS

In drawings which illustrate embodiments of the invention.

DETAILED DESCRIPTION OF THE PREFERRED EMBODIMENTS

Figure 1:
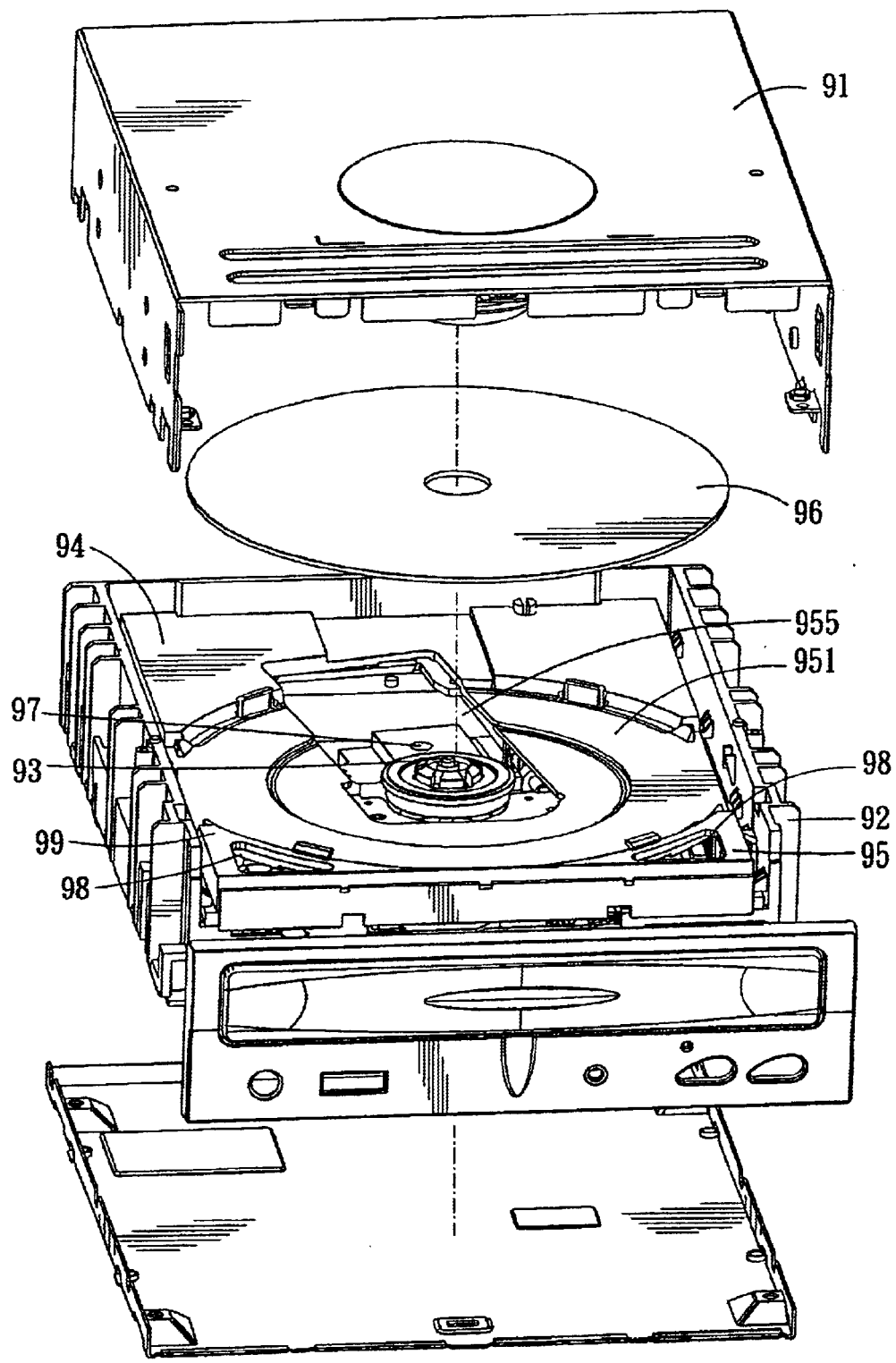
FIG. 1 is an exploded perspective view showing a conventional optical compact disk drive.
Figure 2:
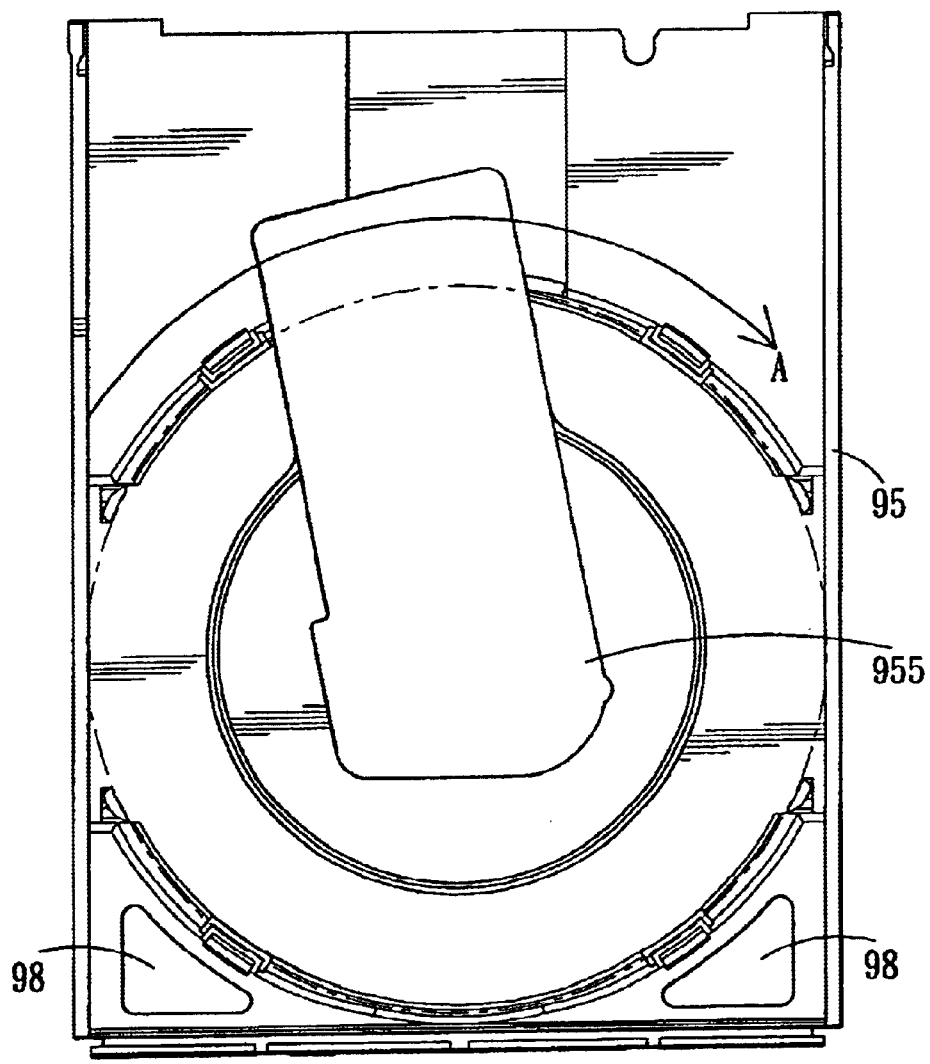
FIG. 2 is a schematic top view showing how a tangential air flow results upon rotation of a compact disk mounted in the conventional optical compact disk drive of FIG. 1.

For the sake of brevity, like elements are denoted by the same reference numerals throughout the disclosure.

Figure 3:
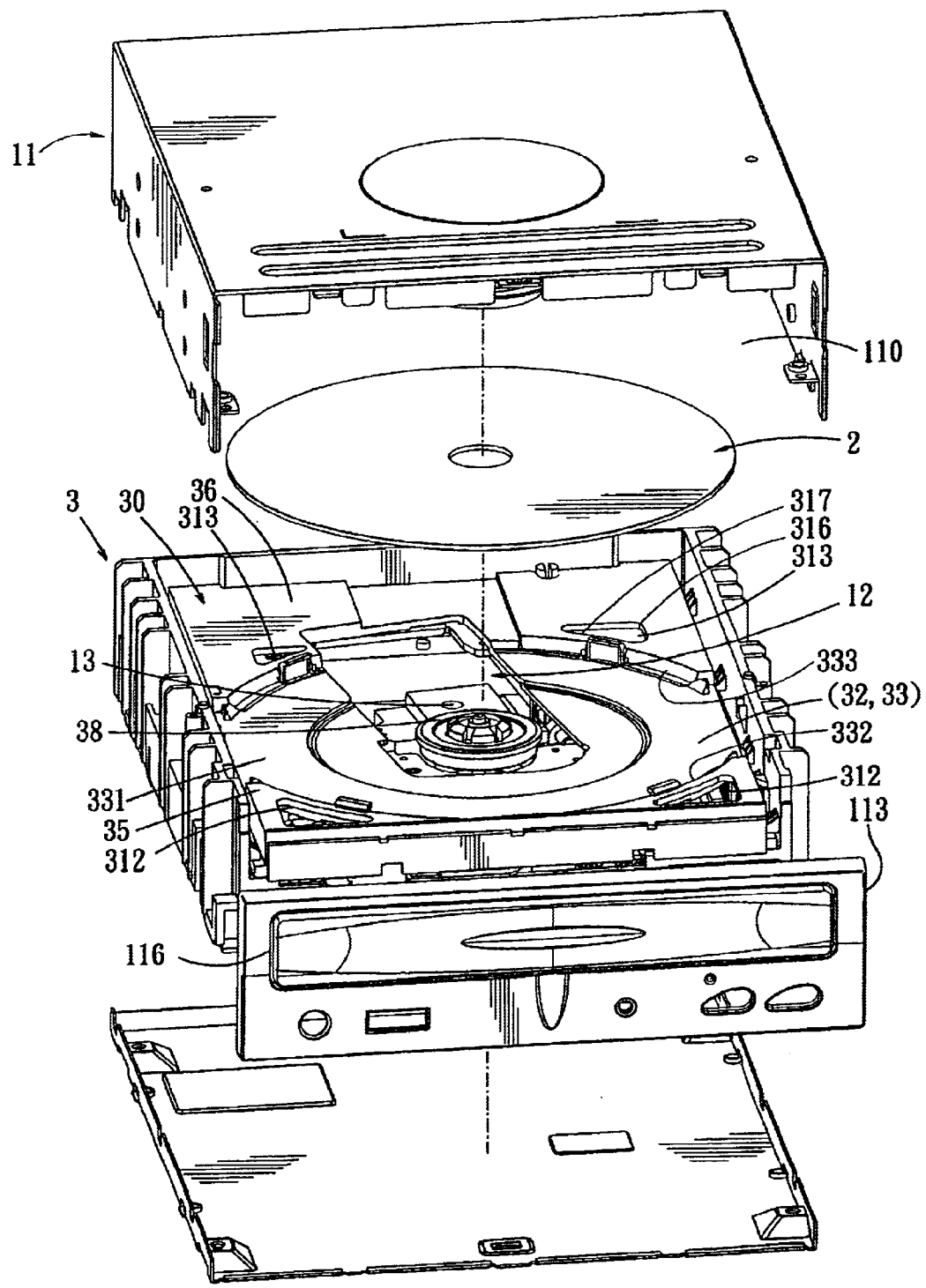
FIG. 3 is an exploded perspective view of a first embodiment of an optical compact disk drive according to this invention.
Figure 4:
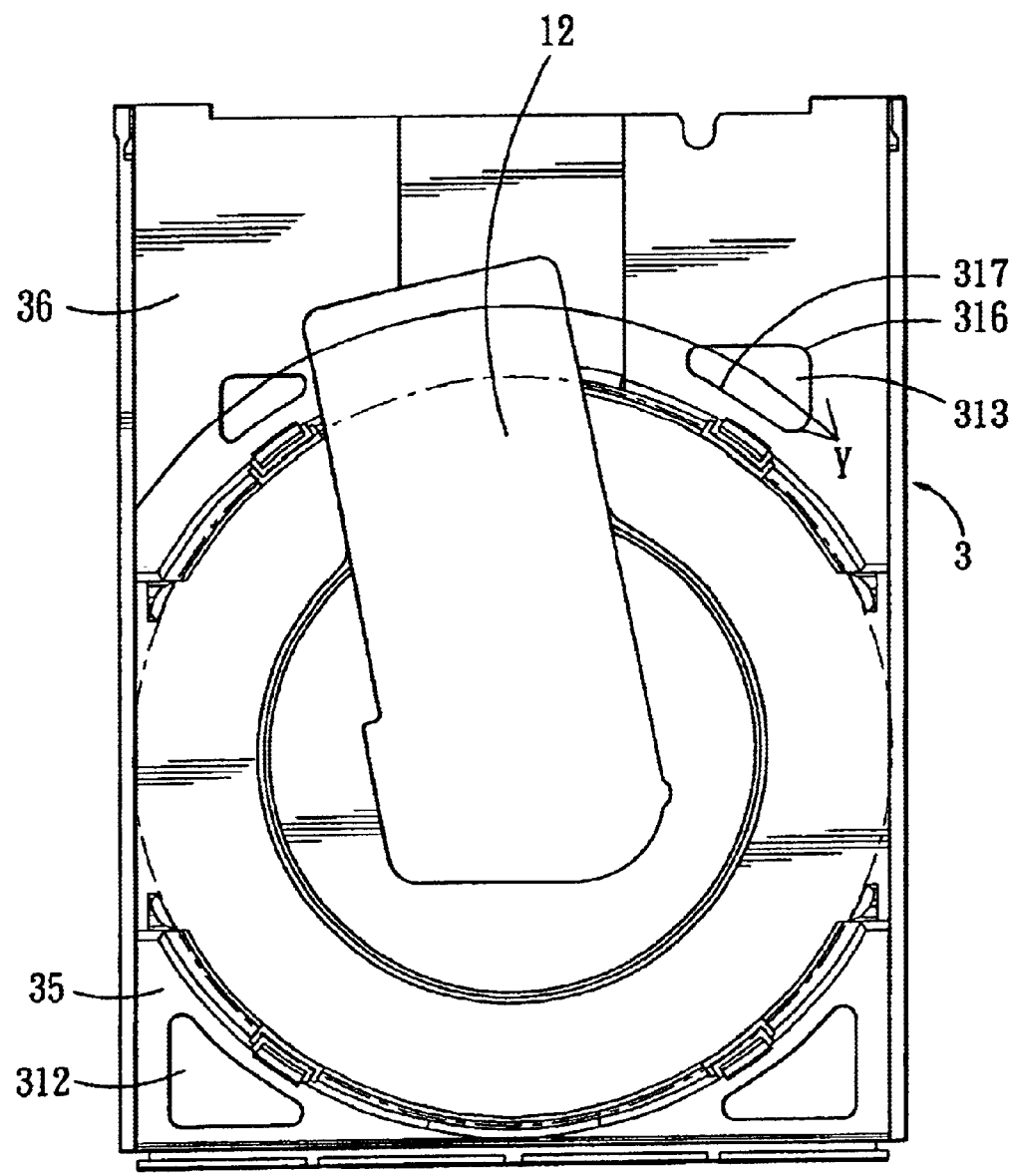
FIG. 4 is a schematic top view showing how a tangential air flow is formed upon rotation of a compact disk mounted in the optical compact disk drive of FIG. 3.
Figure 5:
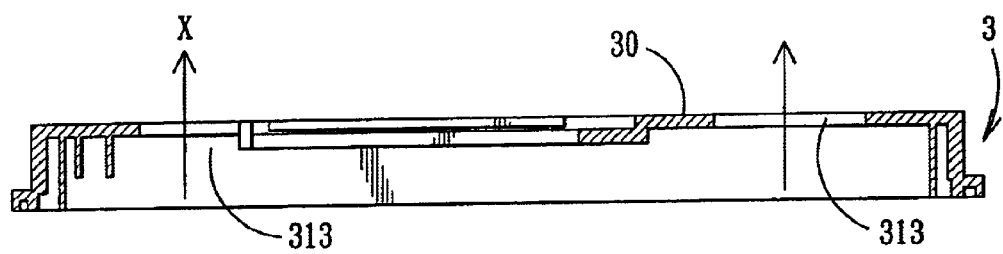
FIG. 5 is a fragmentary sectional view showing how a vertical air flow is formed from a bottom side to a top side of a disk-supporting tray of the optical compact disk drive of FIG. 3 upon rotation of the compact disk.

FIGS. 3 to 5 illustrate a first preferred embodiment of an optical compact disk drive according to this invention. The optical compact disk drive includes: a housing 11 confining a chamber 110 therein and having a front cover 113 with a front opening 116; a mounting seat 3 with a disk-supporting tray 30 that is mounted movably in the chamber 110, that is movable inwardly and outwardly of the housing 11 through the front opening 116 in a horizontal direction, and that is recessed to form a disk-receiving recess 32 which is adapted to receive a compact disk 2 therein, the disk-receiving recess 32 being confined by a recess-confining wall 33 that has a circular base portion 331 extending in the horizontal direction, a front riser portion 332 which is circumferentially disposed around the base portion 331 adjacent to the front opening 116 and which extends from the base portion 331 in a transverse direction relative to the base portion 331 so as to confine a front side of the disk-receiving recess 32, and a rear riser portion 333 which is circumferentially disposed around the base portion 331 at a position opposite to the front riser portion 332 and which extends from the base portion 331 in the transverse direction so as to confine a rear side of the disk-receiving recess 32, the disk-supporting tray 30 having a front peripheral portion 35 that extends frontwardly from the front riser portion 332 in the horizontal direction, and a rear peripheral portion 36 that is opposite to the front peripheral portion 35 and that extends rearwardly from the rear riser portion 333 in the horizontal direction, the disk-supporting tray 30 further having opposite top and bottom sides and being formed with an elongated opening 12 that extends rearwardly from a center of the base portion 331 to the rear peripheral portion 36 so as to be adapted to expose a rotary shaft 38 and a data reading head 13 of the optical compact disk drive to the compact disk 2; and a vibration-and-noise attenuating mechanism having a pair of front air-communicating openings 312 formed in the front peripheral portion 35, and at least a rear air-communicating opening 313 that is formed in the rear peripheral portion 36 and that is disposed adjacent to the elongated opening 12, thereby permitting formation of a vertical air flow (indicated as arrow (X) in FIG. 5) from the bottom side of the disk-supporting tray 30 to the top side of the disk-supporting tray 30 through the front and rear air-communicating openings 312, 313 due to pressure difference between the top and bottom sides upon rotation of the compact disk 2. The aforesaid pressure difference between the top and bottom sides of the disk-supporting tray 30 results from different speeds of tangential air flows (indicated as arrow (Y) in FIG. 4) at the top and bottom sides of the disk-supporting tray 30 upon rotation of the compact disk 2.

In this embodiment, a pair of the rear air-communicating openings 313 are formed in the rear peripheral portion 36, and are respectively disposed at two opposite sides of the elongated opening 12.

Each rear air-communicating opening 313 is generally triangular in shape, and has a right angle 316 and a curved hypotenuse side 317 opposite to the right angle 316. The hypotenuse side 317 of each rear air-communicating opening 313 is circumferentially disposed around and is proximate to the rear riser portion 333.

Figure 6:
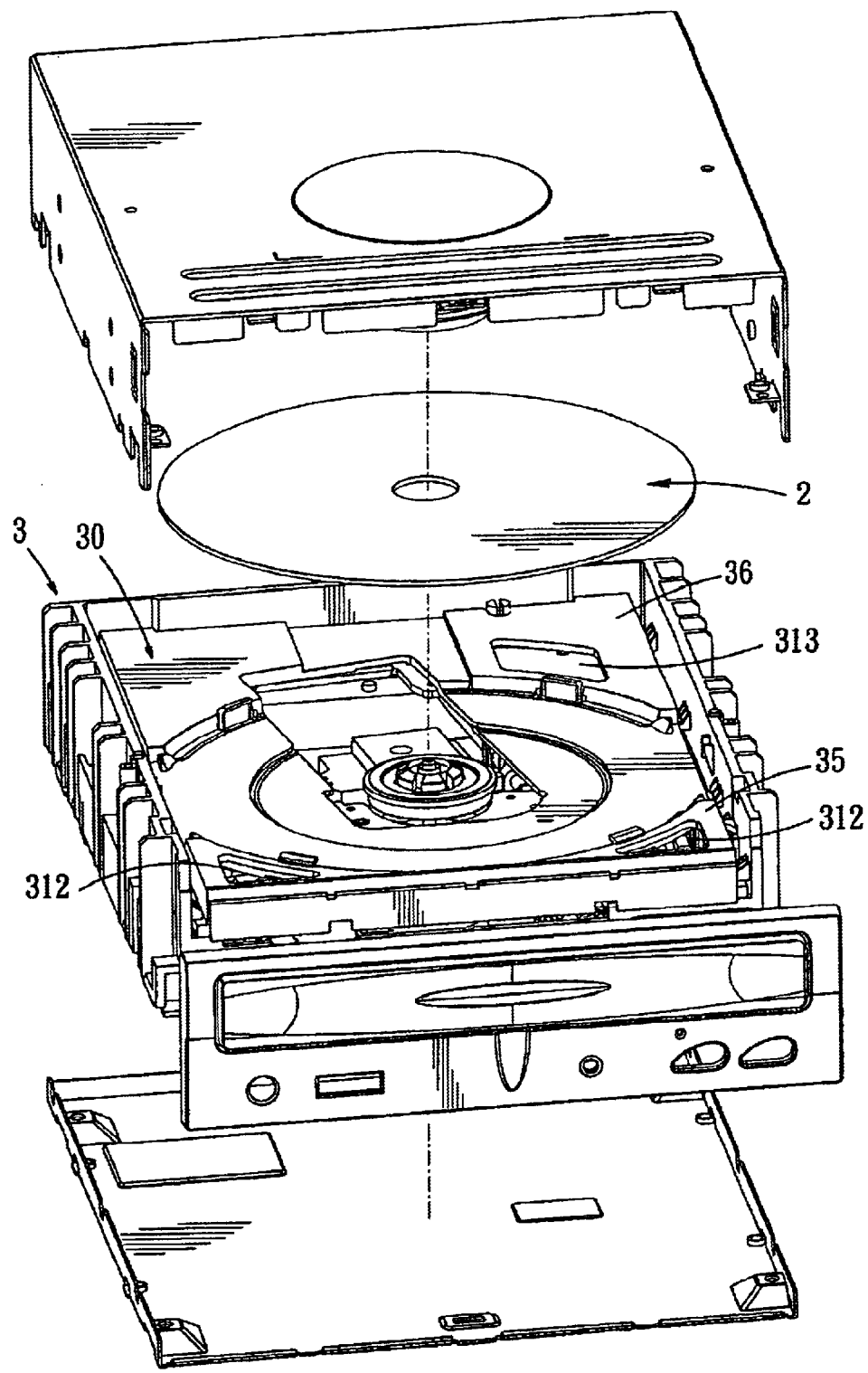
FIG. 6 is an exploded perspective view of a second embodiment of the optical compact disk drive according to this invention.

FIG. 6 illustrates a second preferred embodiment of the optical compact disk drive that has a construction similar to the previous embodiment shown in FIG. 3, except that the sole rear air-communicating opening 313 is generally rectangular in shape, and that the front air-communicating openings 312 are triangular in shape.

By forming the rear air-communicating opening(s) 313 in the rear peripheral portion 36 of the disk-supporting tray 30 adjacent to the elongated opening 12, the aforesaid drawbacks as encountered in the prior art can be eliminated.

With the invention thus explained, it is apparent that various modifications can be made without departing from the spirit of the present invention. It is therefore intended that the invention be limited only as recited in the appended claims.

We claim:

1. An optical compact disk drive comprising:
    a housing confining a chamber therein and having a front opening;
    a mounting seat with a disk-supporting tray that is mounted movably in said chamber, that is movable inwardly and outwardly of said housing through said front opening in a horizontal direction, and that is recessed to form a disk-receiving recess which is adapted to receive a compact disk therein, said disk-receiving recess being confined by a recess-confining wall that has a circular base portion extending in said horizontal direction, a front riser portion which is circumferentially disposed around said base portion adjacent to said front opening and which extends from said base portion in a transverse direction relative to said base portion so as to confine a front side of said disk-receiving recess, and a rear riser portion which is circumferentially disposed around said base portion at a position opposite to said front riser portion and which extends from said base portion in said transverse direction so as to confine a rear side of said disk-receiving recess, said disk-supporting tray having a front peripheral portion that extends frontwardly from said front riser portion in said horizontal direction, and a rear peripheral portion that is opposite to said front peripheral portion and that extends rearwardly from said rear riser portion in said horizontal direction, said disk-supporting tray further having opposite top and bottom sides and being formed with an elongated opening that extends rearwardly from a center of said base portion to said rear peripheral portion; and
    a vibration-and-noise attenuating mechanism having a pair of front air-communicating openings formed in said front peripheral portion, and at least a rear air-communicating opening that is formed in said rear peripheral portion and that is disposed adjacent to said elongated opening, thereby permitting formation of a vertical air flow from said bottom side of said disk-supporting tray to said top side of said disk-supporting tray through said front and rear air-communicating openings due to pressure difference between said top and bottom sides upon rotation of the compact disk.

2. The optical compact disk drive of claim 1, wherein said vibration-and-noise attenuating mechanism has a pair of said rear air-communicating openings that are respectively disposed at two opposite sides of said elongated opening.

3. The optical compact disk drive of claim 1, wherein said rear air-communicating opening is generally triangular in shape, and has a right angle and a curved hypotenuse side opposite to said right angle, said hypotenuse side of said rear air-communicating opening being circumferentially disposed around and proximate to said rear riser portion.

4. The optical compact disk drive of claim 1, wherein said rear air-communicating opening is generally rectangular in shape, and said front air-communicating openings are triangular in shape.

* * * * *